E. PEUCH & A. ARBEY.
APPARATUS FOR USE AS A CLUTCHING, COUPLING, OR LOCKING DEVICE AND THE LIKE.
APPLICATION FILED JULY 17, 1913.

1,227,306. Patented May 22, 1917.

WITNESSES
Alfred R. Anderson
Frank H. Logan

INVENTORS
EMILE PEUCH AND ALPHONSE ARBEY
BY
ATTORNEY

UNITED STATES PATENT OFFICE.

EMILE PEUCH, OF BOURGES, AND ALPHONSE ARBEY, OF BEURE, FRANCE.

APPARATUS FOR USE AS A CLUTCHING, COUPLING, OR LOCKING DEVICE AND THE LIKE.

1,227,306.  Specification of Letters Patent.  Patented May 22, 1917.

Application filed July 17, 1913. Serial No. 779,534.

*To all whom it may concern:*

Be it known that we, EMILE PEUCH and ALPHONSE ARBEY, citizens of the Republic of France, residing the first at 12 Rue de l'Observatoire, Bourges, Cher, in the Republic of France, and the second at Beure, Doubs, in the Republic of France, engineers, have invented certain new and useful Improvements in or Relating to Apparatus for Use as a Clutching, Coupling, or Locking Device and the like, of which the following is a specification.

The object of this invention is to provide a clutch apparatus adapted to couple two parts or members, and capable also of being used as a brake.

Figure 1:
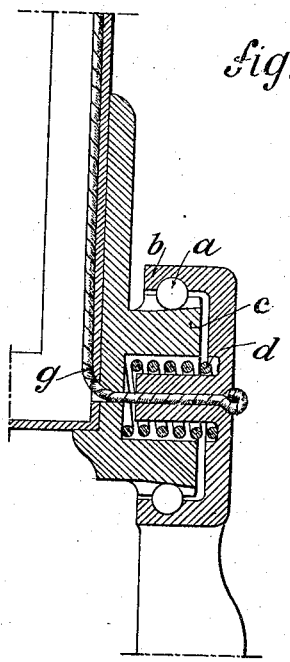
Figure 2:
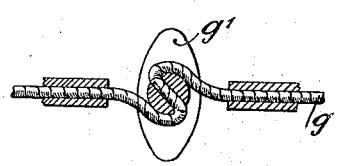
Figure 3:
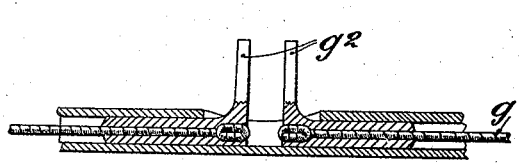

Referring to the accompanying drawings, Figure 1 illustrates, in section, one embodiment of our invention; Fig. 2 illustrates the employment of a knob for uncoupling the parts; Fig. 3 illustrates the employment of a slide.

In the drawing, the improvements are shown as applied to a windshield or other swinging frame.

As shown in Fig. 1, the hub or member $b$ is integral with one of the screen-supports and the trunnion or member $c$ is associated with the swinging screen or frame of a wind-shield. The hub is provided with a circular race-way for balls, $a$, while the trunnion is provided with peripheral radial grooves in which said balls also fit. The bottom walls of the grooves are inclined as shown.

A spring is fitted between the two parts $b$ and $c$, so as to normally tend to move the trunnion axially onto the hub, with the result that the balls, held by the circular raceway, will ride up the inclined grooves of the trunnion and be gripped between the trunnion and hub, thus gripping the frame in any adjusted position.

To release the parts, when desired, for further adjustment, we have provided a cable $g$. A pull on that cable results in moving the trunnion into the hub against the action of the spring; thereupon the balls are freed to run in the circular raceway until the new adjustment is effected. Upon releasing the pull on the cable, the spring locks the hub and trunnion as before mentioned.

Any suitable means may be employed for pulling the cable. In Fig. 2, we have shown the use of a knob, $g'$. The cable is shown as being secured to the knob, and as adapted to lead to and simultaneously unlock two devices of the kind shown in Fig. 1. The structure shown in Fig. 3 employs slides $g^2$ for operating the cables. These slides may be drawn together by hand and will be restored to position by the springs which normally lock the parts together.

It must be noted, that our improvements are not limited to structures having one or more swinging parts, but may be embodied in any structure having one or more of its parts movable in any manner.

Claim:

The combination of a movable frame, a trunnion associated with the frame and provided with inclined cavities, balls in said cavities, a hub surrounding the trunnion and having circular ball-bearings for said balls, a spring tending to move the hub axially of the trunnion, and a cable adapted to move the hub against the action of the spring.

In testimony, that we claim the foregoing as our invention we have signed our names in presence of two subscribing witnesses.

EMILE PEUCH.
ALPHONSE ARBEY.

Witnesses:
 LÉON RÉMOUDY,
 MAURICE ROUX.

Copies of this patent may be obtained for five cents each, by addressing the "Commissioner of Patents, Washington, D. C."